United States Patent
Shimomura

(10) Patent No.: US 10,447,371 B2
(45) Date of Patent: Oct. 15, 2019

(54) BASE STATION APPARATUS, TERMINAL APPARATUS, AND WIRELESS COMMUNICATION METHOD

(71) Applicant: FUJITSU LIMITED, Kawasaki-shi, Kanagawa (JP)

(72) Inventor: Tsuyoshi Shimomura, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 16/191,747

(22) Filed: Nov. 15, 2018

(65) Prior Publication Data
US 2019/0089439 A1 Mar. 21, 2019

Related U.S. Application Data

(63) Continuation of application No. PCT/JP2016/078706, filed on Sep. 28, 2016.

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0632* (2013.01); *H04B 17/336* (2015.01);
(Continued)

(58) Field of Classification Search
CPC .. H04B 7/0626; H04B 17/336; H04B 7/0632; H04L 5/0048; H04L 1/0026; H04L 1/0003; H04W 24/10
See application file for complete search history.

(56) References Cited

U.S. PATENT DOCUMENTS

2006/0160556 A1 7/2006 Mueller et al.
2006/0287743 A1 12/2006 Sampath et al.
(Continued)

FOREIGN PATENT DOCUMENTS

JP 2006-526323 A 11/2006
JP 2010-41285 A 2/2010
(Continued)

OTHER PUBLICATIONS

Spreadtrum Communications, "Discussion on numerology and frame structure", Agenda Item: 8.1.5, 3GPP TSG-RAN WG1 Meeting #84 bis, R1-162549, Busan, Korea, Apr. 11-15, 2016.
(Continued)

*Primary Examiner* — Clemence S Han
(74) *Attorney, Agent, or Firm* — Myers Wolin, LLC

(57) ABSTRACT

A base station apparatus includes: a memory; and processor circuitry coupled to the memory, wherein the processor circuitry is configured to: execute notification processing that includes transmitting a notification signal of a first information associated with a reliability of data transmission, execute transmission processing that includes transmitting a reference signal in two or more frequency bands, and execute reception processing that includes receiving a measurement report that includes a channel quality information of the frequency bands, the channel quality information being derived in accordance with the reliability of the data transmission associated with the first information.

20 Claims, 14 Drawing Sheets

(51) Int. Cl.
*H04L 1/00* (2006.01)
*H04B 17/336* (2015.01)
*H04L 5/00* (2006.01)
*H04B 17/382* (2015.01)
*H04W 72/08* (2009.01)
*H04W 24/10* (2009.01)

(52) U.S. Cl.
CPC ......... *H04B 17/382* (2015.01); *H04L 1/0026* (2013.01); *H04L 5/0048* (2013.01); *H04W 72/085* (2013.01); *H04L 1/0003* (2013.01); *H04W 24/10* (2013.01); *Y02D 70/00* (2018.01)

(56) References Cited

U.S. PATENT DOCUMENTS

| | | | |
|---|---|---|---|
| 2007/0002806 A1 | 1/2007 | Soomro | |
| 2009/0257381 A1 | 10/2009 | Kuri et al. | |
| 2011/0051657 A1* | 3/2011 | Li | H04L 1/0026 370/328 |
| 2011/0149792 A1 | 6/2011 | Nakano et al. | |
| 2012/0058730 A1* | 3/2012 | Jitsukawa | H04L 1/0019 455/63.1 |
| 2012/0140661 A1* | 6/2012 | Ohseki | H04L 1/0019 370/252 |
| 2012/0198077 A1 | 8/2012 | Wei | |
| 2012/0243430 A1* | 9/2012 | Song | H04L 1/0015 370/252 |
| 2012/0300739 A1* | 11/2012 | Froberg Olsson | H04L 1/0006 370/329 |
| 2013/0286881 A1* | 10/2013 | Ding | H04W 8/24 370/252 |
| 2015/0003359 A1* | 1/2015 | Hoshino | H04W 24/08 370/329 |
| 2015/0071239 A1 | 3/2015 | Zhang et al. | |
| 2015/0124901 A1* | 5/2015 | Xu | H04B 17/00 375/267 |
| 2015/0271693 A1* | 9/2015 | Kang | H04W 24/08 370/252 |
| 2015/0382318 A1* | 12/2015 | Kim | G01S 5/0215 455/456.5 |
| 2016/0050601 A1* | 2/2016 | Jeong | H04W 36/14 455/436 |
| 2016/0149688 A1* | 5/2016 | Song | H04L 5/0057 370/329 |
| 2016/0182135 A1* | 6/2016 | Onodera | H04B 7/0452 375/267 |
| 2017/0105210 A1* | 4/2017 | Mar | H04W 52/242 |
| 2017/0111887 A1* | 4/2017 | Hong | H04B 17/345 |
| 2018/0213484 A1* | 7/2018 | Oh | H04W 52/42 |
| 2018/0220399 A1* | 8/2018 | Davydov | H04L 1/0026 |

FOREIGN PATENT DOCUMENTS

| | | |
|---|---|---|
| JP | 2011-244472 A | 12/2011 |
| JP | 2013-509120 A | 3/2013 |
| WO | 2010/026936 A1 | 3/2010 |

OTHER PUBLICATIONS

LG Electronics, "Overall discussion on URLLC", Agenda Item: 8.1.3.2, 3GPP TSG-RAN WG1 Meeting #86, R1-166882, Gothenburg, Sweden, Aug. 22-26, 2016.

International Search Report issued by the Japan Patent Office for corresponding International Patent Application No. PCT/JP2016/078706, dated Nov. 22, 2016, with an English translation.

Written Opinion of the International Searching Authority issued by the Japan Patent Office for corresponding International Patent Application No. PCT/JP2016/078706, dated Nov. 22, 2016, with an English translation.

Extended European Search Report for corresponding European Application No. 16917676.5 dated Jul. 16, 2019.

\* cited by examiner

FIG. 6

| MCS | MODULATION SCHEME | CODING RATE |
|---|---|---|
| 31 | 256QAM | 3/4 |
| 30 | | 1/2 |
| 29 | | 1/3 |
| 28 | | 1/4 |
| 27 | 64QAM | 3/4 |
| 26 | | 1/2 |
| 25 | | 1/3 |
| 24 | | 1/4 |
| ⋮ | | |
| 4 | QPSK | 3/4 |
| 3 | | 1/2 |
| 2 | | 1/3 |
| 0 | | 1/4 |

402

BASE STATION APPARATUS, TERMINAL APPARATUS, AND WIRELESS COMMUNICATION METHOD

CROSS-REFERENCE TO RELATED APPLICATION

This application is a continuation application of International Application PCT/JP2016/078706 filed on Sep. 28, 2016 and designated the U.S., the entire contents of which are incorporated herein by reference.

FIELD

The present invention relates to a base station apparatus, a terminal apparatus, and a wireless communication method.

BACKGROUND

In a wireless communication system that uses Long Term Evolution (LTE), a base station apparatus performs allocation of a radio resource and determination of a Modulation and Coding Scheme (MCS), based on channel quality information of each terminal apparatus. Accordingly, when transmission in downlink is performed, in order to perform the allocation of a suitable radio resource and the determination of the MCS on each terminal apparatus, the base station apparatus acquires, in advance, feedback information relating to a channel from each terminal apparatus.

The feedback information relating to the channel is referred to as Channel State Information (CSI). For example, a Channel Quality Indicator (CQI), a Rank Indicator (RI), a Precoding Matrix Indicator (PMI), a Beam Indicator (BI), a CSI Reference signal resource Indicator (CRI), and the like are included in the CSI. For example, in a case where an error rate is set in advance to 0.1, the terminal apparatus feeds a maximum value of the CQI that does not exceed 0.1 which is an error rate that is set based on a result of channel measurement, as the CQI, back to the base station apparatus.

Furthermore, in the wireless communication system that uses LTE, two types of CQIs, a Wideband CQI and a Subband CQI are defined. The Wideband CQI is a CQI that is calculated with an entire band as a unit. Furthermore, the Subband CQI is a CQI that is calculated with contiguous frequency bands as a unit.

Moreover, in recent years, research and development of 5 Generation (G) systems as mobile communication systems have been actively conducted. In the 5G system, Ultra Reliable Low Latency Communications (URLLC), as a technology that is added to a normal broadband communication, are given attention. In the wireless communication system that uses the URLLC, for example, in order to cause an application that uses short-delay communication with high reliability to run, it is desirable that data transfer at a lower error rate than ever in a wireless section is realized. In this case, each of the reliability and the delay, which are obtained according to a type of service that is provided, varies, and an error rate also varies according to the type of service that is provided. As services that use the URLLC, for example, examples of dealing with malfunction of a substation and controlling the substation, controlling a power supply system that uses a smart grid technology, providing a virtual presence environment, executing an industrial control application, providing automatic operation or the tactile-sensing Internet, and so forth are considered.

It is noted that, in the related art, such as a technology for wireless communication, in the allocation of the radio resource, the terminal apparatus is notified whether non-contiguous radio resources are allocated or contiguous radio resources are allocated in a frequency domain. Furthermore, in the related art, in a case where contiguous carrier aggregation is performed, distribution of the radio resource is performed in a centralized way and in a case where non-contiguous carrier aggregation is performed, the distribution of the radio resource is performed in a distributed way.

Examples of the related art include PTL 1: Japanese Laid-open Patent Publication No. 2011-244472, PTL 2: Japanese National Publication of International Patent Application No. 2013-509120.

SUMMARY

According to an aspect of the invention, a base station apparatus includes: a memory; and processor circuitry coupled to the memory, wherein the processor circuitry is configured to: execute notification processing that comprises transmitting a notification signal of a first information associated with a reliability of data transmission, execute transmission processing that comprises transmitting a reference signal in two or more frequency bands, and execute reception processing that comprises receiving a measurement report that includes a channel quality information of the frequency bands, the channel quality information being derived in accordance with the reliability of the data transmission associated with the first information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of an MCS selection table.

DESCRIPTION OF EMBODIMENTS

However, a channel between the terminal apparatus and the base station apparatus changes with time, and reliability of scheduling based on the CSI decreases due to a delay between a timing at which the CSI is measured and a timing at which the base station apparatus actually transmit data to the terminal apparatus. For this reason, there is a concern that the error rate will increase. In a case where the error rate increases, in the wireless communication system, there is a concern that the URLLC which is obtained will be difficult to provide.

Particularly, in a short-delay communication such as the URLLC, there is a likelihood that retransmission will not be performed or will be allowed only in a limited manner, and there is a concern that the increase in the error rate will lead directly to a decrease in reliability of communication.

Furthermore, although a technology in the related art that notifies whether non-contiguous radio resources or contiguous radio resources in the frequency domain are allocated is used, it is difficult to keep the reliability of the scheduling based on the CSI from decreasing. Furthermore, although the technology of determining which one of the centralized way and the distributed way is used to distribute the radio resource according to a type of carrier aggregation is used in the related art, it is difficult to keep the reliability of the scheduling based on the CSI from decreasing.

An object of the technology in the disclosure, which is disclosed in view of the above-described problems, is to provide a base station apparatus, a terminal apparatus, a wireless communication system, and a wireless communication system control method, which efficiently realize high-reliability short-delay communication.

Embodiments of a base station apparatus, a terminal apparatus, a wireless communication system, and a wireless communication system control method, which are disclosed in the present application, will be described in detail below with reference to the drawings. It is noted that the base station apparatus, the terminal apparatus, the wireless communication system, and the wireless communication system control method are not limited by the following embodiments.

Embodiments

Figure 1:
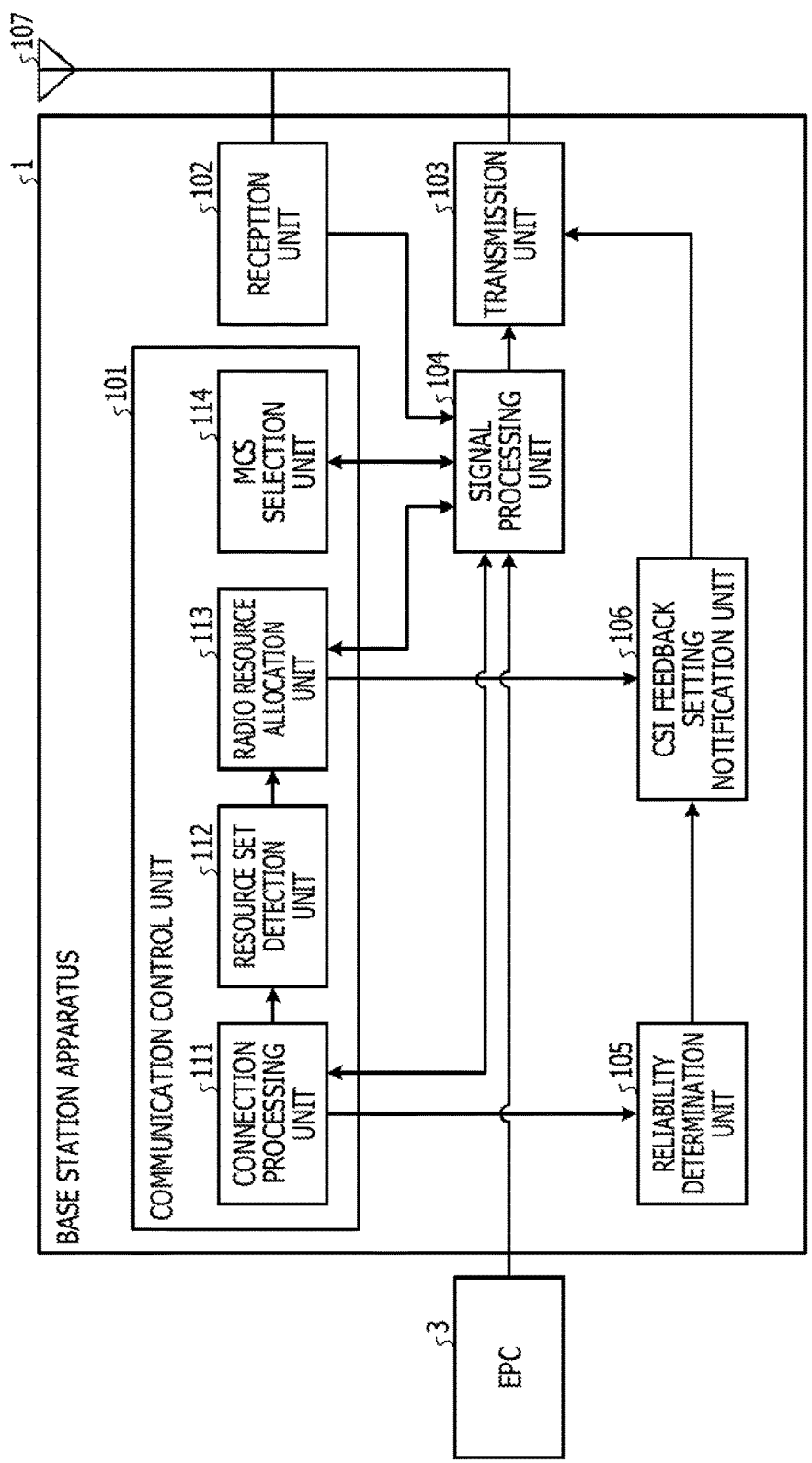
FIG. 1 is a block diagram of a base station apparatus according to an embodiment.
Figure 2:
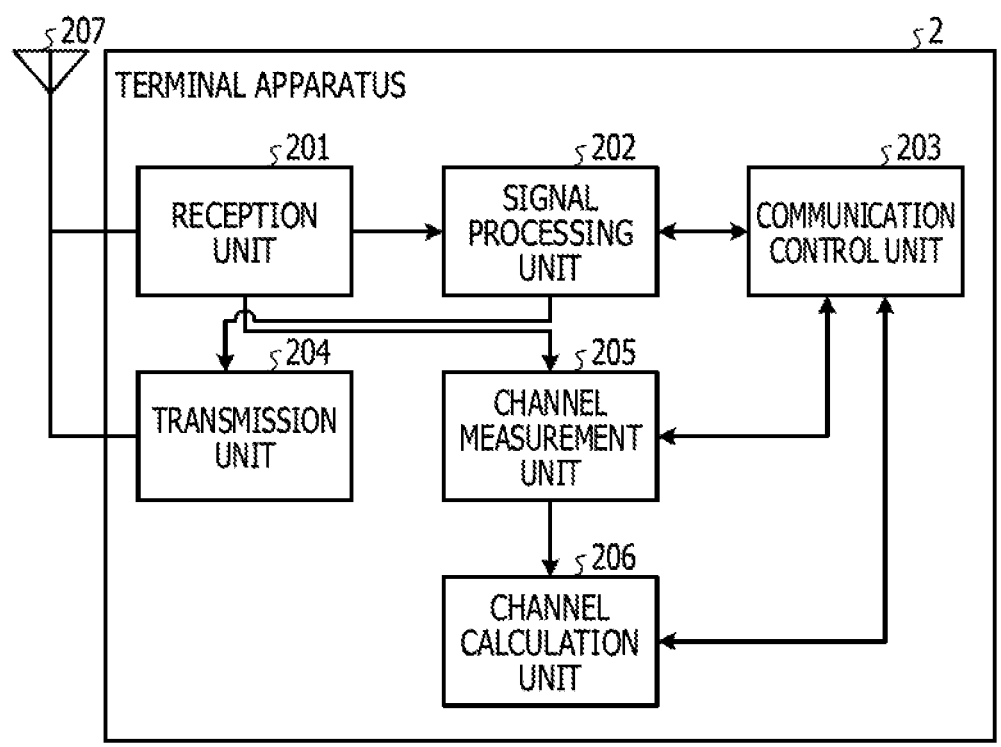
FIG. 2 is a block diagram of a terminal apparatus according to the embodiment.

FIG. 1 is a block diagram of a base station apparatus according to an embodiment. Furthermore, FIG. 2 is a block diagram of a terminal apparatus according to the embodiment. A base station apparatus 1 in FIG. 1 and a terminal apparatus 2 in FIG. 2 perform wireless communication. The base station apparatus 1 and the terminal apparatus 2 perform any one of data transmission in downlink from the base station apparatus 1 to the terminal apparatus 2 and data transmission in uplink from the terminal apparatus 2 to the base station apparatus 1. However, in the following description, the data transmission in downlink that uses URLLC will be described below in an emphasized manner.

As illustrated in FIG. 1, the base station apparatus 1 according to the present embodiment includes a communication control unit 101, a reception unit 102, a transmission unit 103, a signal processing unit 104, a reliability determination unit 105, a CSI feedback setting notification unit 106, and an antenna 107.

The reception unit 102 may receive a wireless signal from the terminal apparatus 2 via the antenna 107. Then, the reception unit 102 may output the received signal to the signal processing unit 104.

The communication control unit 101 may perform general control of transmission and reception of a signal to and from the terminal apparatus 2, such as communication scheduling. The communication control unit 101 has a connection processing unit 111, a resource set determination unit 112, a radio resource allocation unit 113, and an MCS selection unit 114. The communication control unit 101 corresponds to an example of a "transmission setting determination unit."

The connection processing unit 111 may receive input of a signal that is to be used for a call connection processing such as requesting of a call connection, from the signal processing unit 104. Then, the connection processing unit 111 may perform the call connection processing, such as one that causes a call connection response to be transmitted to the signal processing unit 104, according to the signal that is to be used for the call connection processing, and may establish a call between the terminal apparatus 2 and the base station apparatus 1. Subsequently, the terminal apparatus 2 may make a connection to a communication partner via the base station apparatus 1 and an evolved packet core (EPC) 3 that is a core network. Thereafter, the connection processing unit 111 may acquire a data transmission request that is transmitted from a partner to the terminal apparatus 2 or the terminal apparatus 2. At this point, information on a type of service that is provided to the terminal apparatus 2 may be included in the data transmission request. Then, the connection processing unit 111 may output the information on the type of service that is provided to the terminal apparatus 2, to the resource set determination unit 112 and the reliability determination unit 105.

The resource set determination unit 112 may store in advance non-contiguous frequency bands that result from division, which are a plurality of frequency bands that are used for communication that uses the URLLC. The resource set determination unit 112 may receive input of the information on the type of service that is provided to the terminal apparatus 2, from the connection processing unit 111. Then, the resource set determination unit 112 may determine a set of non-contiguous frequency bands, as a resource set, which is to be used for transmission of a signal to the terminal apparatus 2, among the non-contiguous frequency bands that are stored, from a size of data that is transmitted for the service that is provided, or the like.

Figure 3:
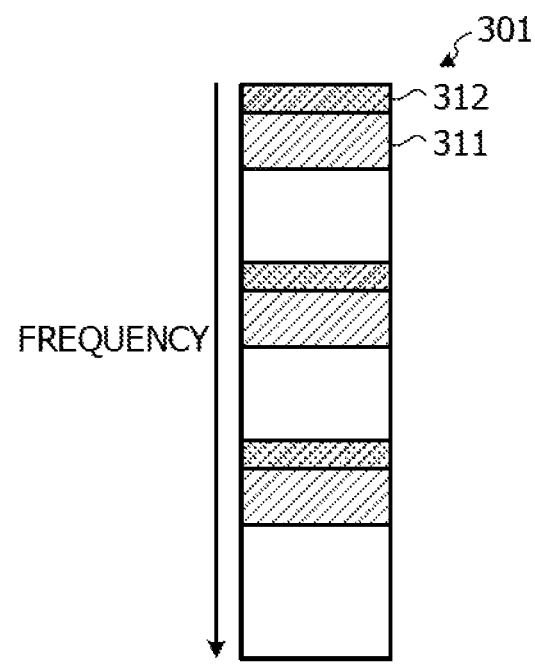
FIG. 3 is a diagram for describing selection of a resource set.

FIG. 3 is a diagram for describing selection of the resource set. An available frequency band 301 in FIG. 3 is a frequency band that is available to the base station apparatus 1 for communication. For example, the resource set determination unit 112 stores in advance non-contiguity frequency bands 311 that are illustrated by an oblique line, of the available frequency band 301 which is illustrated in FIG. 3, as frequency bands that are to be used for the communication that uses the URLLC. Then, the resource set determination unit 112 selects a resource set 312 that is illustrated as gray areas in FIG. 3, as the set of non-contiguous frequency bands that is to be used for the transmission of the signal to the terminal apparatus 2, from the non-contiguity frequency bands 311. At this point, in FIG. 3, the resource set determination unit 112 secures, as the resource set 312, leading areas of all the non-contiguous frequency bands that are included in the non-contiguity frequency bands 311, respectively, but a method of securing the resource set 312 is not limited to this. For example, the resource set determination unit 112 may select several frequency bands from among non-contiguous frequency bands that are included in the non-contiguity frequency bands 311, respectively, and may secure areas for the resource set 312 from the selected frequency bands. Furthermore, the resource set determination unit 112 may secure, as the resource set 312, areas other than the leading areas, of the non-contiguous frequency bands that are included in the non-contiguity frequency bands 311, respectively. However, it is desirable that a plurality of non-contiguous frequency bands that are included in the resource set 312 are separated by 5 MHz or more from each other.

Figure 4:
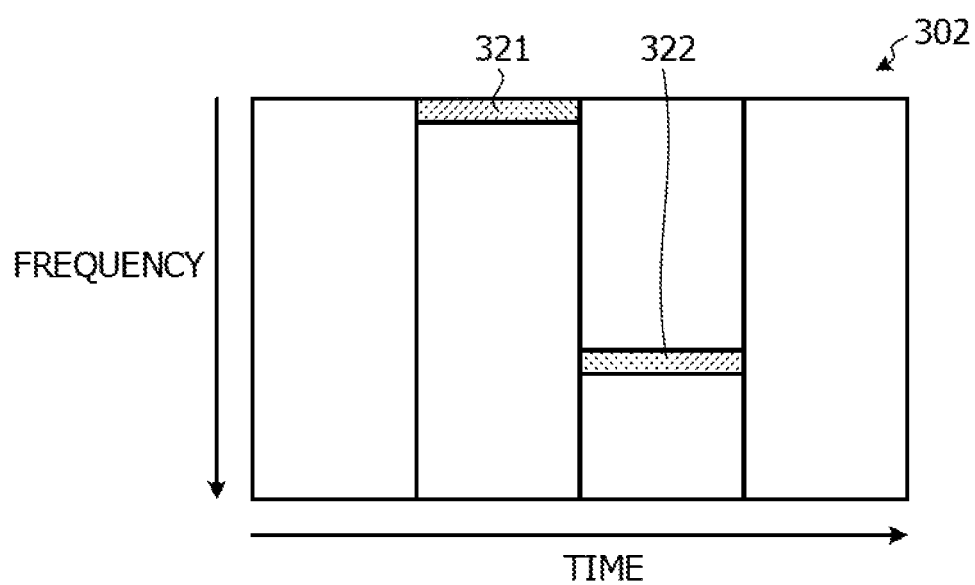
FIG. 4 is a diagram for describing another example of the selection of the resource set.

Furthermore, in FIG. 3, non-contiguous frequency bands in one-time signal transmission are defined as the resource set, but as long as the frequency band is non-contiguous, the resource set determination unit 112 may determine the resource set using any other method. For example, FIG. 4 is a diagram for describing another example of the selection of the resource set. As illustrated in FIG. 4, a frequency band that is available to the base station apparatus 1 for communication is also present in the time direction, and is expressed as an available frequency band 302. In this case, the resource set determination unit 112 may define non-contiguous frequency bands 321 and 322 in different times, of the available frequency band 302, as a resource set.

The description is continued with reference back to FIG. 1. The resource set determination unit 112 determines a resource set that is used for the transmission of the signal to the terminal apparatus 2, and then outputs information on the determined resource set to the radio resource allocation unit 113.

The radio resource allocation unit 113 may receive input of information on the resource set that is used for the transmission of the signal to the terminal apparatus 2, from the resource set determination unit 112. Then, the radio resource allocation unit 113 may perform allocation of a radio resource to a CSI measurement reference signal from the information on the resource set. Next, the radio resource allocation unit 113 outputs information on a radio resource that is allocated to the CSI measurement reference signal to the signal processing unit 104 and the CSI feedback setting notification unit 106. Moreover, the radio resource allocation unit 113 determines a CSI transmission timing for the terminal apparatus 2, and output the determined CSI transmission timing to the CSI feedback setting notification unit 106. The CSI transmission timing is a timing at which the terminal apparatus 2 which transmits CSI to the base station apparatus 1, and for example, is set in such a manner that the CSI is periodically transmitted.

Furthermore, the radio resource allocation unit 113 acquires the CSI that is transmitted from the terminal apparatus 2, from the signal processing unit 104. For example, a CQI, an RI, a PMI, a BI, a CRI, and the like are included in the CSI. Furthermore, either or both of the reception signal power S and the interference power (I+N) may be included. Then, the radio resource allocation unit 113 determines a radio resource that is used for the transmission of the signal to the terminal apparatus 2, using the acquired CSI and the information on the resource set. Then, the radio resource allocation unit 113 notifies the signal processing unit 104 of the radio resource that is used for the transmission of the signal to the terminal apparatus 2.

The MCS selection unit 114 acquires the CSI that is transmitted from the terminal apparatus 2, from the signal processing unit 104. In the present embodiment, in addition to the above-described information, information on a correlation value, and information on a time for measurement of channel information are included in the CSI. At this point, the correlation value is a value indicating whether a relationship among signals that are transmitted using non-contiguous frequency bands, respectively, which are determined as the resource set, is close or remote. Furthermore, the time for the measurement of the channel information is a time at which the terminal apparatus 2 performs the measurement of the channel information that may include a reception signal power, an interference power and a noise power.

The MCS selection unit 114 acquires the CQI from the CSI. Then, the MCS selection unit 114 converts the CQI into a Signal-to-Interference plus Noise power Ratio (SINR). The SINR is a value indicating a value indicating a ratio between a power of a desired signal and a power of a signal other than the desired signal, among reception signals. However, in a case where either or both of the reception signal power S and the interference power (I+N) are included instead of the CQI, the MCS selection unit 114 computes the SINR. For example, the SINR may be calculated from the interference power that is included in the CSI, and the reception signal power that is computed from uplink transmission from the terminal apparatus 2.

Figure 5:
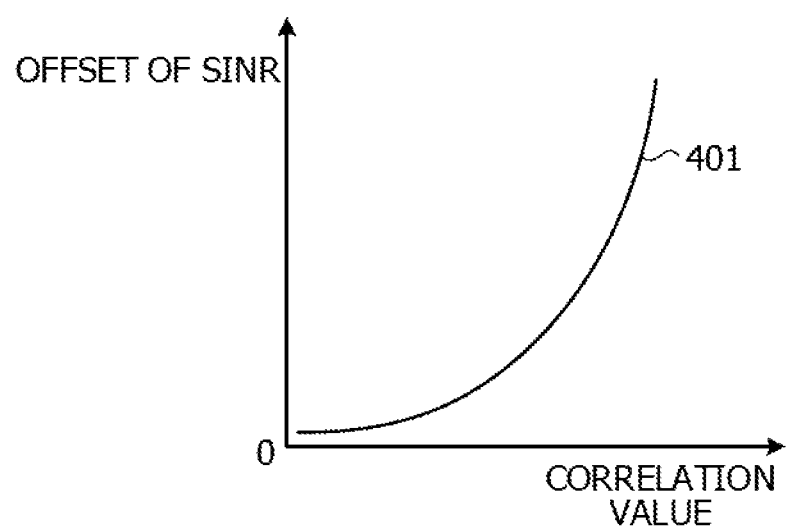
FIG. 5 is a graph illustrating a relationship between a correlation value and an offset of an SINR.

Furthermore, the MCS selection unit 114 acquires the correlation value from the CSI. At this point, the MCS selection unit 114 may store in advance a function representing a relationship between the correlation value and an offset of the SINR, as on a graph 401 that is illustrated in FIG. 5. FIG. 5 is a graph illustrating the relationship between the correlation value and the offset of the SINR. Then, the MCS selection unit 114 acquires the offset of the SINR that corresponds to the acquired correlation value, using a function of which a plot is the graph 401.

Furthermore, the MCS selection unit 114 may store in advance a function representing a relationship between a delay time and the offset of the SIRN. Then, the MCS selection unit 114 acquires the time for the measurement of the channel information from the CSI. Next, the MCS selection unit 114 calculates an estimated time for data transmission. Then, the MCS selection unit 114 subtracts the time for the measurement of the channel information from the estimated time for data transmission, and calculates a delay time from when the channel information is measured to when the data transmission is performed. At this point, a function representing the relationship between the delay time and the offset of the SIRN is a function that corresponds to a graph representing the relationship between the delay time and the offset of the SIRN, which is the same as that on the graph 401 that is illustrated in FIG. 5.

At this point, the MCS selection unit 114, for example, has an MCS selection table 402 that is illustrated in FIG. 6. FIG. 6 is a diagram illustrating an example of the MCS selection table. As illustrated in FIG. 6, an MCS is represented by a five-bit value. Then, a modulation scheme and a coding rate are registered in the MCS selection table 402 in a manner that corresponds to each MCS. In the MCS selection table 402 according to the present embodiment, the smaller a number of the MCS, the lower an error occurrence rate and the smaller an amount of data transmission. That is, it may be said that the smaller the number of the MCS, the higher the reliability, but that it takes time to transmit all pieces of transmission target data, thereby increasing the delay. At this point, if channel communication quality is good, the error occurrence rate decreases. Because of this, much more of error occurrence due to modulation or coding may be allowed. Therefore, in a case where the channel communication quality is good, is desirable that the MCS selection unit 114 selects an MCS that has a higher number, thereby shortening the delay.

The MCS selection unit 114 may subtract an offset due to the correlation value and the delay time from the SINR that is obtained from the CQI, and calculates a value of the SINR for obtaining the MCS. Next, the MCS selection unit 114 converts the calculated value of the SINR into a five-bit value. Then, the MCS selection unit 114 specifies an MCS that corresponds to the five-bit value that results from the conversion of the value of the SINR, from the MCS selection table 402. Thereafter, the MCS selection unit 114 notifies the signal processing unit 104 of a modulation scheme and a coding rate that corresponds to the specified MCS. The modulation scheme and the coding rate that are notified by the MCS selection unit 114, and a radio resource that is used for the transmission of the signal to the terminal apparatus 2, which is notified by the radio resource allocation unit 113, are an example of "communication setting."

The description is continued with reference back to FIG. 1. The transmission unit 103 receives input of various signals that are used for the call connection processing, such as the call connection response, from the signal processing unit 104. Then, the transmission unit 103 transmits the various signals, which are used for the call connection processing, to the terminal apparatus 2 via the antenna 107. Furthermore, the transmission unit 103 receives input of a data transmission signal from the signal processing unit 104 at the time of the data transmission. Then, the transmission unit 103 may transmit the acquired data transmission signal to the terminal apparatus 2 via the antenna 107.

Furthermore, the transmission unit 103 receives input of a CSI feedback setting from the CSI feedback setting notification unit 106. Then, the transmission unit 103 may transmit the acquired CSI feedback setting to the terminal apparatus 2 via the antenna 107.

The signal processing unit 104 receives transmission instructions for various signals that are used for the call connection processing, such as a transmission instruction for a connection response, from the connection processing unit 111. Then, according to the transmission instruction, the signal processing unit 104 outputs the various signals that are used for the call connection processing, to the transmission unit 103.

Furthermore, the signal processing unit 104 may receive input of the CSI that is transmitted from the terminal apparatus 2, from the reception unit 102. Then, the signal processing unit 104 outputs the acquired CSI to the radio resource allocation unit 113 and the MCS selection unit 114.

Furthermore, the signal processing unit 104 may receive a transmission signal from an EPC 3. Furthermore, the signal processing unit 104 may receive input of the modulation scheme and the coding rate from the MCS selection unit 114. Moreover, the signal processing unit 104 may receive a notification of the radio resource that is used for the transmission of the signal to the terminal apparatus 2, from the radio resource allocation unit 113.

Then, the signal processing unit 104 performs modulation processing and coding processing on the transmission signal that is received from the EPC 3, using the designated modulation scheme and coding rate. Moreover, the signal processing unit 104 allocates the designated radio resource to the transmission signal. Thereafter, the signal processing unit 104 outputs the transmission signal to the transmission unit 103. The modulation processing and the coding processing by the signal processing unit 104, and the allocation of the radio resource are an example of performing "processing on a signal using a transmission setting."

The reliability determination unit 105 may store in advance the reliability that is requested for every service. For example, in the case of a service of dealing with malfunction of a substation and providing control of the substation, the reliability determination unit 105 stores the reliability or the like that is such that an error rate is $10^{-4}$ or less.

The reliability determination unit 105 receives input of the information on the type of service that is provided to the terminal apparatus 2, from the connection processing unit 111. Then, the reliability determination unit 105 outputs information on the reliability of the service that is provided to the terminal apparatus 2, to the CSI feedback setting notification unit 106.

The CSI feedback setting notification unit 106 receives input of the information on the radio resource that is allocated to the CSI measurement reference signal, from the radio resource allocation unit 113. Moreover, the CSI feedback setting notification unit 106 receives input of information on a radio resource that is used by the terminal apparatus 2 for CSI transmission, from the radio resource allocation unit 113. Furthermore, the CSI feedback setting notification unit 106 receives information on the reliability that is obtained in signal transmission to the terminal apparatus 2, from the reliability determination unit 105.

Then, the CSI feedback setting notification unit 106 notifies the transmission unit 103 of the CSI feedback setting that may include CSI measurement reference signal information, the CSI transmission timing, and a CSI computation condition, using the acquired information. At this point, a transmission timing, a frequency, a pattern, and the like of the CSI measurement reference signal are included in the CSI measurement reference signal information. Furthermore, the reliability that is to be satisfied for the signal transmission to the terminal apparatus 2 is included in the CSI computation condition.

Next, the terminal apparatus 2 will be described with reference to FIG. 2. The terminal apparatus 2, as illustrated in FIG. 2, has a reception unit 201, a signal processing unit 202, a communication control unit 203, a transmission unit 204, a channel measurement unit 205, a channel information calculation unit 206, and an antenna 207.

The reception unit 201 may receive a signal that is transmitted from the base station apparatus 1, via the antenna 207. Then, the reception unit 201 may output the received signal to the signal processing unit 202.

The signal processing unit 202 receives inputs of the signal that is transmitted from the base station apparatus 1, from the reception unit 201. Then, the signal processing unit 202 performs decoding processing and demodulation processing, and the like on the acquired signal. Then, the signal processing unit 202 outputs the signal on which the processing is performed, to the communication control unit 203.

Furthermore, the signal processing unit 202 receives input of data that is transmitted, from the communication control unit 203. Then, the signal processing unit 202 performs the modulation processing, the coding processing, and the like on acquired data, and generates a transmission signal. Then, the signal processing unit 202 outputs the generated transmission signal to the transmission unit 204.

Furthermore, the signal processing unit 202 outputs data that is included in the signal that is transmitted from the base station apparatus 1, to the communication control unit 203.

The communication control unit 203 receives input of the signal that is transmitted from the base station apparatus 1, from the signal processing unit 202. The communication control unit 203 performs the call connection processing. After a call connection is completed, the communication control unit 203 causes the signal processing unit 202 to transmit a service request to the base station apparatus 1.

Thereafter, when receiving the CSI feedback setting, the communication control unit 203 notifies the channel measurement unit 205 of the CSI measurement reference signal information that is included in the CSI feedback setting. Furthermore, the CSI computation condition is output to the channel information calculation unit 206.

Thereafter, the communication control unit 203 acquires a correlation value of a signal in the non-contiguous frequency bands in the resource set, from the channel information calculation unit 206. Moreover, the CQI, the RI, the PMI, the BI, and the CRI, which result from systematizing all signals in the non-contiguous frequency bands, respectively, that are included in the resource set, are acquired from the channel information calculation unit 206. Furthermore, the communication control unit 203 acquires channel information on a signal in each of the non-contiguous frequency bands that are included in the resource set, along with the time for measurement of the channel information, from the channel measurement unit 205. Thereafter, the communication control unit 203 creates the CSI that may include the CQI, the RI, the PMI, the BI, and the CRI, which result from systematizing all the signals in the non-contiguous frequency bands, respectively, that are included in the resource set, the correlation value of the signal in each of the non-contiguous frequency bands that are included in the resource set, and the time for the measurement of the channel information. Then, the communication control unit 203 outputs the created CSI to the signal processing unit 202, and causes the created CSI to be transmitted to the base station apparatus 1. Thereafter, according to a transmission periodicity of the CSI, the communication control unit 203 outputs the CSI to the signal processing unit 202, and causes the CSI to be transmitted to the base station apparatus 1.

Furthermore, the communication control unit 203 provides data that is acquired from the signal processing unit 202, in the form of audio, letters, an image, or the like, to an operator.

The channel measurement unit 205 receives input of the CSI measurement reference signal information from the communication control unit 203. Next, the channel measurement unit 205 acquires the transmission timing for the reference signal in each of the non-contiguous frequency bands that are included in the resource set, the frequency, and the pattern, which are included in the CSI measurement reference signal information. Then, using the acquired information, the channel measurement unit 205 acquires the reception signal power, the interference power, and the noise power of the signal in each of the non-contiguous frequency bands that are included in the resource set, from the signal that is received by the reception unit 201. The reception signal power, the interference power, and the noise power of the signal in each of the non-contiguous frequency bands that are included in the resource set are an example of "individual information."

Moreover, the channel measurement unit 205 acquires a measurement time at which pieces of channel information, such as the reception signal power, the interference power, and the noise power, are measured. Thereafter, the channel measurement unit 205 outputs the reception signal power, the interference power, and the noise power of the signal in each of the non-contiguous frequency bands that are included in the acquired resource set, to the channel information calculation unit 206. Furthermore, the channel measurement unit 205 outputs the time for the measurement of the channel information to the communication control unit 203. The measurement time, for example, is expressed as a number of a subframe or a slot for stipulating the transmission time in the base station apparatus 1.

The channel information calculation unit 206 calculates the SINR of the signal in each of the non-contiguous frequency bands that are included in the resource set. In the following, the SINR of the signal in each of the non-contiguous frequency bands that are included in the resource set refers to an "individual SINR."

Next, the channel information calculation unit 206 calculates SINRs of all the non-contiguous frequency bands that are included in the resource set, using the individual SINR. In the following, overall SINR in the non-contiguous frequency bands that are included in the resource set refer to "overall SINR." For example, the channel information calculation unit 206 may calculate the overall SINR by using a Shannon theorem for a communicational capacity in the individual SINR, or Exponential effective SINR Mapping or Mutual Information based Effective SINR Mapping. Furthermore, the channel information calculation unit 206 may define an average value of individual SINRs as the overall SINR. In this manner, as long as the overall SINR represent a state of reception quality that results from systematizing all the signals in the non-contiguous frequency bands that are included in the resource set, the overall SINR may be obtained in any way. The overall SINR may correspond to an example of the "total information."

Figure 7:
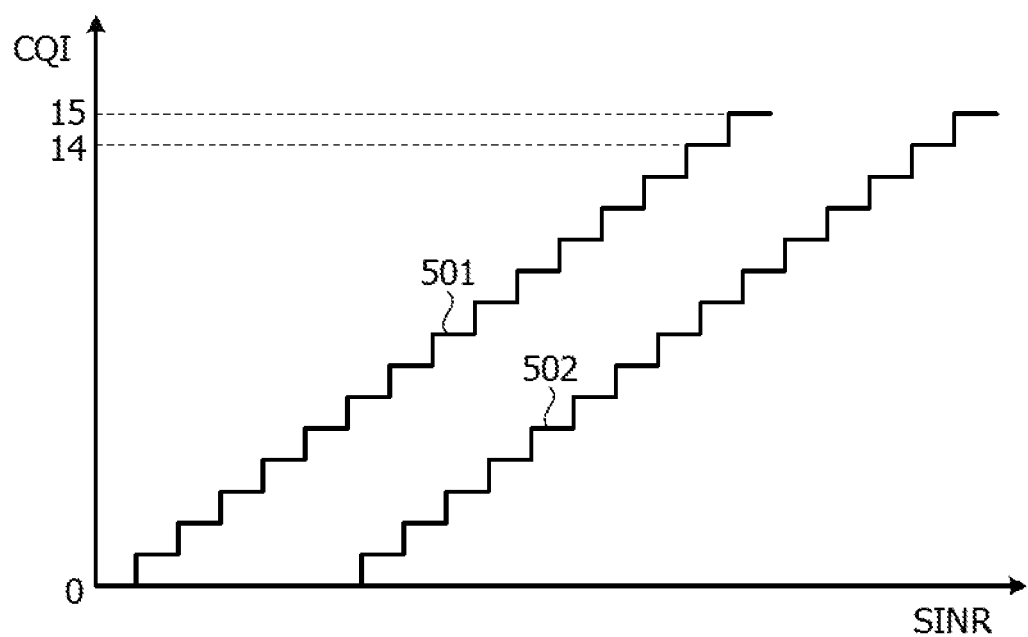
FIG. 7 is a graph for describing a conversion function between the SINR and a CQI.

At this point, the channel information calculation unit 206 has a conversion function between the SINR and the CQI that are represented by a relationship that is illustrated in FIG. 7. FIG. 7 is a graph for describing the conversion function between the SINR and the CQI. A graph 501 in FIG. 7 is a graph representing a relationship between the SINR and the CQI for satisfying the reliability that is such that the error rate is $10^{-1}$ or less. Furthermore, a graph 502 is a graph representing the relationship between the SINR and the CQI for satisfying the reliability that is such that the error rate is $10^{-5}$ or less. The graphs 501 and 502 are graphs for converting the SINR into the CQI that has values of 0 to 15 which are expressed in four bits. As illustrated in FIG. 7, the higher the reliability, the higher value the SINR to which the CQI correspond has. That is, one that has a higher reliability, of the CQIs that has the same value, corresponds to a state where the reception quality is good.

The channel information calculation unit 206, for example, has the conversion function in accordance with the reliability, in such a manner that a function in a case where the reliability is $10^{-1}$ is plotted on the graph 501 and that a function in a case where the reliability is $10^{-5}$ is plotted on the graph 502.

The channel information calculation unit 206 acquires the reliability that is included in the CSI feedback setting. Next, the channel information calculation unit 206 selects the conversion function between the SINR and the CQI, which corresponds to the acquired reliability. Then, the channel information calculation unit 206 converts the all calculated SINRs into the CQI, using the selected conversion function.

Next, the channel information calculation unit 206 calculates the correlation value of each value, by using the correlation function with respect to each of the signals in the non-contiguous frequency bands that are included in the resource set or doing other things. At this point, the channel information calculation unit 206 may obtain a standard deviation as a correlation value.

Then, the channel information calculation unit 206 transmits the calculated CQI and correlation value to the communication control unit 203. At this point, in the present embodiment, the terminal apparatus 2 converts the SINR into a CQI that is expressed in four bits, and notifies the base station apparatus 1 of the CQI as implicit information. However, in a case where transmission of a great amount of data to the base station apparatus 1 is allowable, the terminal apparatus 2 may notify the base station apparatus 1 the SINR as is, as explicit information. Furthermore, instead of the SINR, the terminal apparatus 2 may transmit either the reception signal power S or an interference power I explicitly or implicitly.

Figure 8:
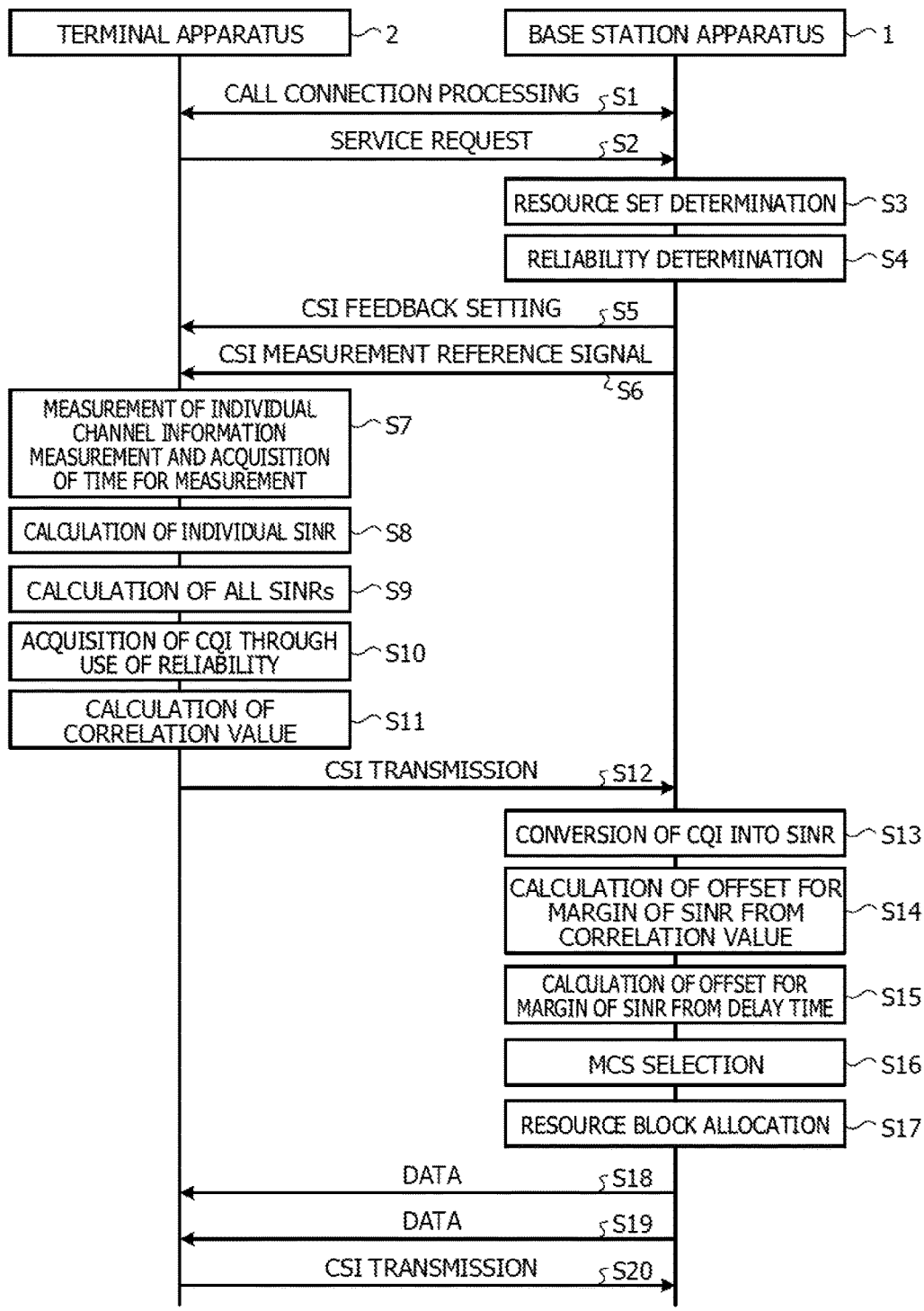
FIG. 8 is a sequence diagram for control of communication that uses URLLC in a wireless communication system according to the embodiment.

Next, a flow for control of the communication that uses the URLLC in the wireless communication system according to the present embodiment will be described with reference to FIG. 8. FIG. 8 is a sequence diagram for the control of the communication that uses the URLLC in the wireless communication system according to the embodiment.

The connection processing unit 111 of the base station apparatus 1 and the communication control unit 203 of the terminal apparatus 2 may perform the call connection processing that performs mutual communication (Step S1).

After call establishment, the communication control unit 203 of the terminal apparatus 2 may transmit the service request including the information on the type of service to the base station apparatus 1 (Step S2). The connection processing unit 111 of the base station apparatus 1 may receive the service request. Then, the connection processing unit 111 outputs the information on the type of service to the resource set determination unit 112 and the reliability determination unit 105.

The resource set determination unit 112 acquires the information on the type of service from the connection processing unit 111. Then, the resource set determination unit 112 acquires a size of data or the like that is used for the service to be provided, from the size of service, and determines the resource set that has the non-contiguous frequency band (Step S3). Then, the resource set determination unit 112 outputs the acquired reliability to the radio resource allocation unit 113. The radio resource allocation unit 113 performs allocation of the radio resource to the CSI measurement reference signal from the information on the resource set. Next, the radio resource allocation unit 113 outputs information on the radio resource that is allocated to the CSI measurement reference signal to the signal processing unit 104 and the CSI feedback setting notification unit 106. Moreover, the radio resource allocation unit 113 determines the CSI transmission timing for the terminal apparatus 2, and output the determined CSI transmission timing to the CSI feedback setting notification unit 106.

Furthermore, the reliability determination unit 105 acquires the information on the type of service from the connection processing unit 111. Then, the reliability determination unit 105 determines the reliability that is requested for the service which is provided to the terminal apparatus 2, for the reliability that is requested for every service that is determined in advance (Step S4). Then, the reliability determination unit 105 outputs the acquired reliability to the CSI feedback setting notification unit 106.

The CSI feedback setting notification unit 106 acquires the information on the radio resource that is allocated to the CSI measurement reference signal and information on the CSI transmission timing, from the radio resource allocation unit 113. Moreover, the CSI feedback setting notification unit 106 acquires the reliability from the reliability determination unit 105. Then, the CSI feedback setting notification unit 106 transmits the CSI feedback setting that may include the CSI measurement reference signal information, the CSI transmission timing, and the CSI computation condition, to the terminal apparatus 2, using the acquired information (Step S5). The communication control unit 203 of the terminal apparatus 2 may receive the CSI feedback setting. Then, the communication control unit 203 notifies the channel measurement unit 205 of the CSI measurement reference signal information. Furthermore, the communication control unit 203 notifies the reliability to the channel information calculation unit 206.

Thereafter, the signal processing unit 104 may transmit the CSI measurement reference signal in each of the non-contiguous frequency bands that are included in the resource set, using the radio resource that is allocated by the radio resource allocation unit 113 (Step S6).

The channel measurement unit 205 acquires the CSI measurement reference signal information from the communication control unit 203. Then, the channel measurement unit 205 measures the channel information using the CSI measurement reference signal information. Moreover, the channel measurement unit 205 acquires the time for the measurement of the channel information (Step S7). Then, the channel measurement unit 205 outputs the reception signal power, the interference power, and the noise power, which are included in the channel information, to the channel information calculation unit 206. Furthermore, the channel measurement unit 205 outputs the channel information and the time for the measurement of the channel information to the communication control unit 203.

The channel information calculation unit 206 receives input of the reception signal power, the interference power, and the noise power from the channel measurement unit 205. Then, the channel information calculation unit 206 calculates an individual SINR using the reception signal power, the interference power, and the noise power (Step S8).

Moreover, the channel information calculation unit 206 calculates the overall SINR using the calculated individual SINR (Step S9).

Next, the channel information calculation unit 206 may acquire the CQI corresponding to the overall SINR, using a function representing the relationship between the SINR and the CQI in accordance with the reliability (Step S10).

Moreover, the channel information calculation unit 206 calculates the correlation value between each of the signals in the non-contiguous frequency bands that are included in the resource set, using the correlation function (Step S11). Then, the channel information calculation unit 206 outputs the acquired CQI and the information on the correlation value to the communication control unit 203.

The communication control unit 203 acquires the CQI and the information on the correlation value from the channel information calculation unit 206. Then, the communication control unit 203 generates the CSI that may include the CQI, the correlation value, and the time for the measurement of the channel information, and the communication control unit 203 may transmit the created CSI to the base station apparatus 1 (Step S12).

The MCS selection unit 114 of the base station apparatus 1 acquires the CQI, the correlation value, and a transmission time for the channel information. Then, the CQI is converted into the SINR (Step S13).

Next, the MCS selection unit 114 calculates an offset for a margin of the SINR from the correlation value (Step S14).

Moreover, the MCS selection unit 114 calculates a delay time from the transmission time for the channel information to the transmission of data to the terminal apparatus 2. Then, the MCS selection unit 114 calculates the offset for the margin of the SINR from the calculated delay time (Step S15).

Then, the MCS selection unit 114 selects an MCS that corresponds to a value that results from subtracting the calculated offset from the SINR, from the MCS selection table 402 (Step S16). Thereafter, the MCS selection unit 114 notifies the signal processing unit 104 of a modulation scheme and a coding rate that corresponds to the selected MCS. The signal processing unit 104 performs the modulation processing and the coding processing on the transmission signal for transmitting data to the terminal apparatus 2, using the modulation scheme and the coding rate, which are notified from the MCS selection unit 114.

Furthermore, the radio resource allocation unit 113 determines a resource block that is allocated to the data that is to be transmitted to the terminal apparatus 2, using the resource set. The signal processing unit 104 allocates the resource block, which is designated by the radio resource allocation unit 113, to the transmission signal (Step S17). Thereafter, the signal processing unit 104 outputs the transmission signal to the transmission unit 103.

Then, the transmission unit 103 may transmit data to the terminal apparatus 2 by using the transmission signal that is acquired from the signal processing unit 104 (Step S18).

The signal processing unit 104 and the transmission unit 103 performs the data transmission while repeating selection of the MCS and resource block allocation according to the delay time using the CSI of which the acquisition is completed until a next CSI is sent from the terminal apparatus 2 (Step S19).

Thereafter, when a transmission timing for the CIS comes, channel measurement unit 205, the channel information calculation unit 206, and the communication control unit 203 of the terminal apparatus 2 acquires the CSI that performs the same processing in each of Steps S7 to S11. Then, the communication control unit 203 may transmit the acquired CSI to the base station apparatus 1 (Step S20).

Subsequently, the terminal apparatus 2 periodically transmits the CSI to the base station apparatus 1. Then, the base station apparatus 1 performs processing in each of Steps S13 to S17 using the received CSI, and then repeats the data transmission to the terminal apparatus 2.

At this point, in the following description, the base station apparatus 1 obtains the margin of the SINR using the correlation function and the delay time from the time for the measurement of the channel information to the data transmission, and performs the selection of the MCS. However, if an error of the SINR may be allowed to some degree, the base station apparatus 1 may select the MCS that corresponds to the SINR which is obtained from the notified CQI without using the correlation function and the delay time. Furthermore, the base station apparatus 1 may perform the selection of the MCS using the offset of the SINR that is obtained from one of the correlation function and the delay time.

Figure 9:
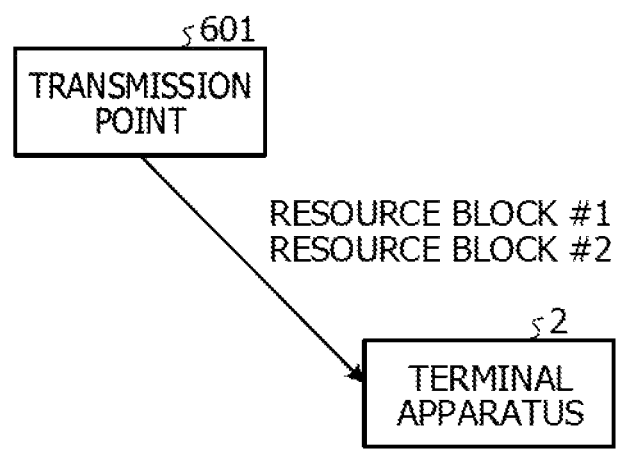
FIG. 9 is a diagram illustrating an example of data transmission that uses the resource set.
Figure 10:
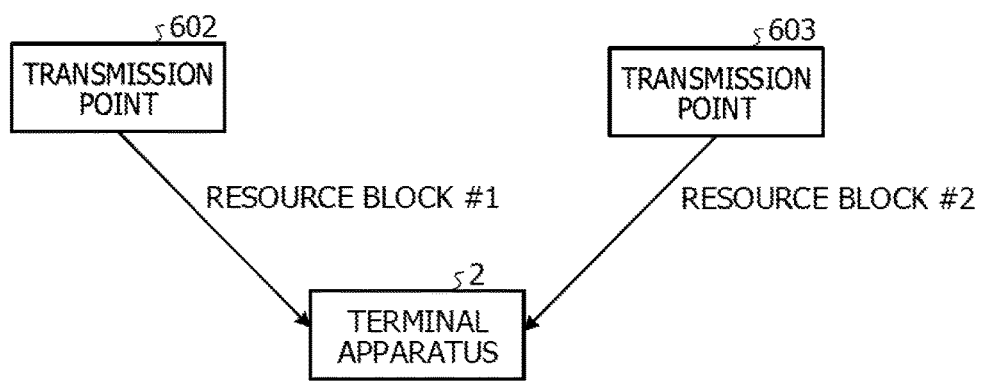
FIG. 10 is a diagram illustrating another example of the data transmission that uses the resource set.

Moreover, a scheme for the data transmission that uses the resource set is described with reference to FIGS. 9 and 10. FIG. 9 is a diagram illustrating an example of the data transmission that uses the resource set. Furthermore, FIG. 10 is a diagram illustrating another example of the data transmission that uses the resource set. A case where resource blocks #1 and #2 in different non-contiguous frequency bands are set as the resource set is described here.

FIG. 9 is a diagram illustrating a configuration in which one transmission point 601 is present and the terminal apparatus 2 receives data from the one transmission point 601. The transmission point 601 may be the base station apparatus 1 and may be a Remote Radio Head (RRH) that the base station apparatus 1 has. In this case, the transmission point 601 transmits data to the terminal apparatus 2 using the resource blocks #1 and #2.

On the other hand, in FIG. 10, two transmission points, transmission points 602 and 603, are present. Then, a configuration is employed in which the terminal apparatus 2 receives data from both the transmission points 602 and 603. The transmission points 602 and 603, for example, are different RRHs that one base station apparatus 1 has. Furthermore, in a case where two base station apparatuses 1 perform coordinated communication, the transmission points 602 and 603 may be different base station apparatuses 1. In this case, for example, the transmission point 602 transmits data to the terminal apparatus 2 using the resource block #1. Furthermore, the transmission point 603 transmits data to the terminal apparatus 2 using the resource block #2.

Figure 11:
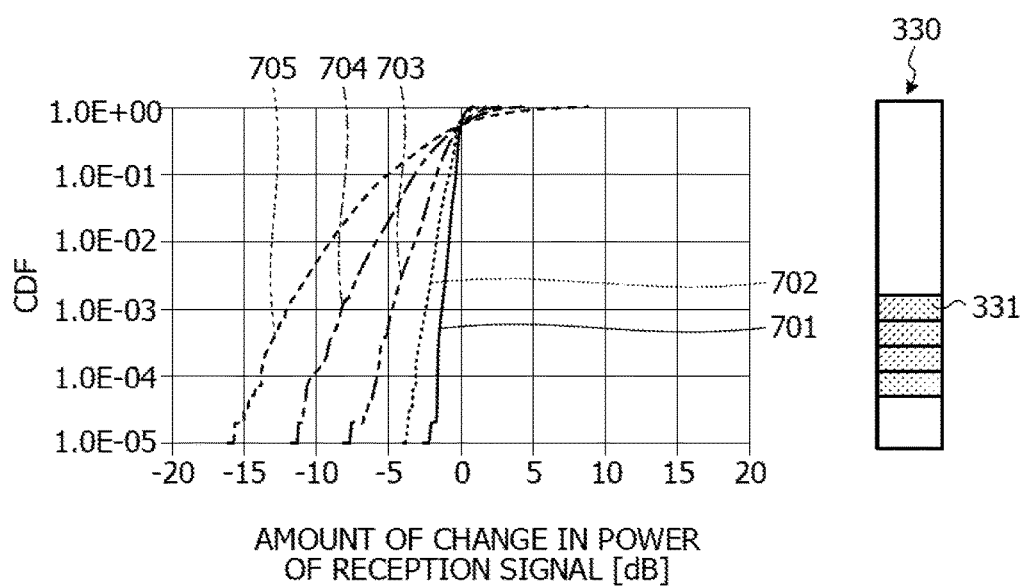
FIG. 11 is a diagram for describing reliability in a case where data is transmitted using contiguous frequency bands.

Next, an effect in a case where data is transmitted using the non-contiguous frequency bands will be described with reference to FIGS. 11 and 12. FIG. 11 is a diagram for describing the reliability in a case where data is transmitted using the contiguous frequency bands. Furthermore, FIG. 12 is a diagram for describing the reliability in the case where data is transmitted using the non-contiguous frequency bands.

FIG. 11 illustrates a case where data is transmitted using a plurality of contiguous frequency bands 331 within an available frequency band 330. The frequency bands 331 are all 10 MHz. A Cumulative Distribution Function (CDF) in a case where data is transmitted using the frequency bands 331 is illustrated in the left portion of FIG. 11. On the left portion, an amount of change in reception signal power is plotted on the horizontal axis, and a value of a result of calculation that uses a cumulative distribution function that corresponds to amounts of change in the reception signal power is plotted on the vertical axis. Graphs 701 to 705 are plots of a cumulative distribution function in accordance with the delay time from the time of the measurement of the channel information to the data transmission. The graph 701 is a plot of a cumulative distribution function in a case where the delay time is 1 ms. The graph 702 is a plot of a cumulative distribution function in a case where the delay time is 2 ms. The graph 703 is a plot of a cumulative distribution function in a case where the delay time is 4 ms. The graph 704 is a plot of a cumulative distribution function in a case where the delay time is 8 ms. The graph 705 is a plot of a cumulative distribution function in a case where the delay time is 16 ms.

Figure 12:
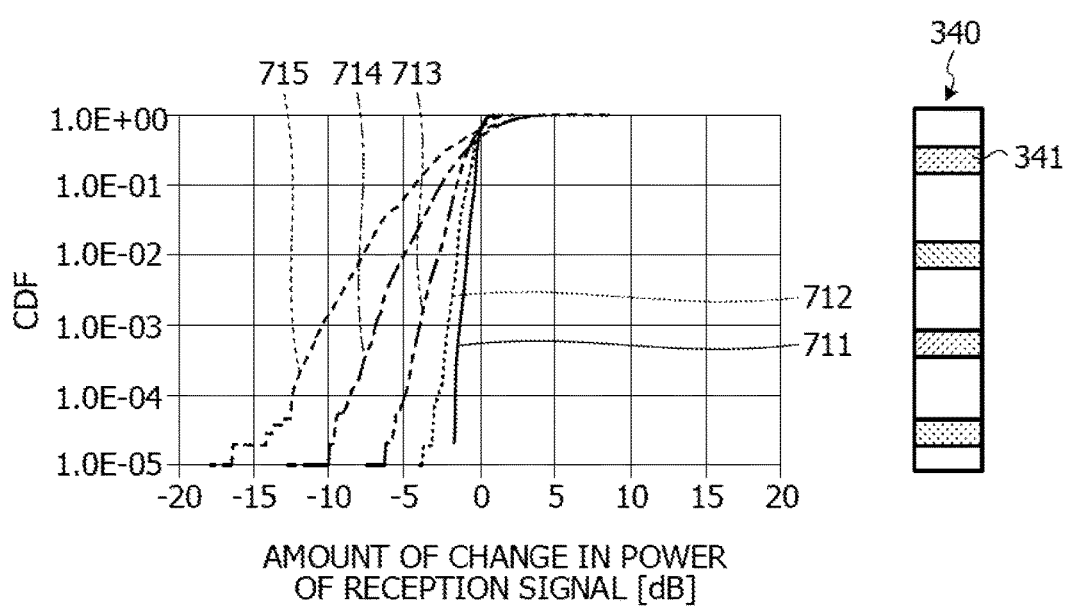
FIG. 12 is a diagram for describing reliability in the case where data is transmitted using non-contiguous frequency bands.

Furthermore, FIG. 12 illustrates a case where data is transmitted using a plurality of non-contiguous frequency bands 341 within the available frequency band 340. The frequency bands 341 are all 10 MHz. The Cumulative Distribution Function in the case where data is transmitted using the frequency bands 341 is illustrated in the left portion of FIG. 12. On the left portion, an amount of change in reception signal power is plotted on the horizontal axis, and a value of a result of calculation that uses a cumulative distribution function that corresponds to amounts of change in the reception signal power is plotted on the vertical axis. A graph 711 is a plot of the cumulative distribution function in the case where the delay time is 1 ms. A graph 712 is a plot of the cumulative distribution function in the case where the delay time is 2 ms. A graph 713 is a plot of the cumulative distribution function in the case where the delay time is 4 ms. A graph 714 is a plot of the cumulative distribution function in the case where the delay time is 8 ms. A graph 715 is a plot of the cumulative distribution function in the case where the delay time is 16 ms.

When the graphs 711 to 715 and the graphs 701 to 705 are compared, the graphs 711 to 715 have the same probability of occurrence as graphs 701 to 705, respectively, in a state where an amount of change in power is smaller. That is, the amount of change in power is more suppressed in a case where data is transmitted using a plurality of non-contiguous frequency bands 341 than in a case where data is transmitted using a plurality of contiguous frequency bands 331. In this manner, data is transmitted using the plurality of non-contiguous frequency bands 341, and thus the amount of change in power in accordance with the delay and the reliability of the communication for which the radio resource that uses the CSI is allocated may be improved.

As described above, the wireless communication system according to the present embodiment determines the MCS and the radio resource that is to be allocated to the transmission signal in the resource set, using the channel information that results for systematizing all signals in the non-contiguous frequency bands that are included in the resource set. Accordingly, the MCS in which a large amount of data is transmitted by suppressing error occurrence as much as possible may be selected. Furthermore, data may be transmitted using the non-contiguous frequency bands. Therefore, the wireless communication system according to the present embodiment may efficiently realize high-reliability short-delay communication.

Moreover, the base station apparatus according to the present embodiment, provides a margin to the MCS, considering a correlation relationship between the signals in the non-contiguous frequency bands that are included in the resource set, and the delay time from the time for the measurement of the channel information to the data transmission. Accordingly, the base station apparatus according to the present embodiment may select a more suitable MCS, and may contribute to the high-reliability and short-delay of communication.

(Hardware Configuration)

Figure 13:
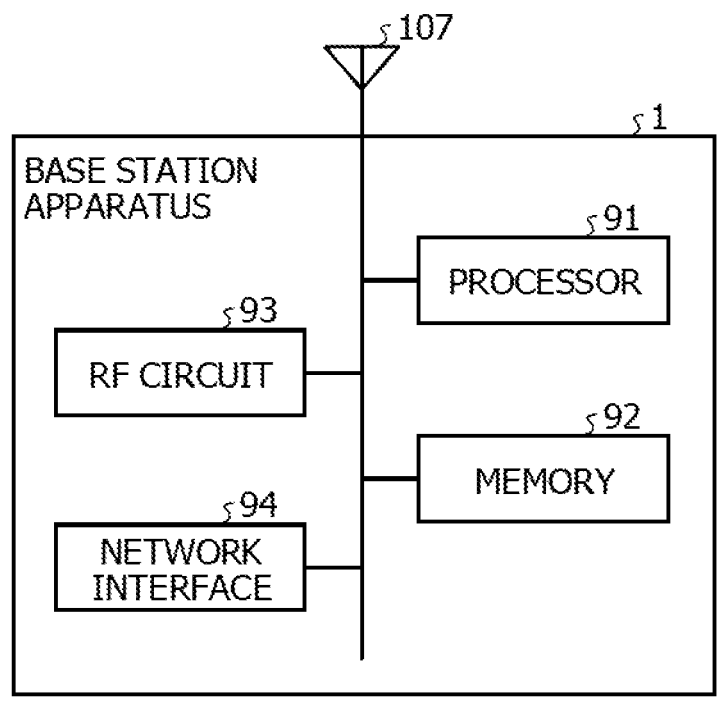
FIG. 13 is a diagram illustrating a hardware configuration of a base station apparatus.

Next, a hardware configuration of the base station apparatus 1 will be described with reference to FIG. 13. FIG. 13 is a diagram of a hardware configuration of the base station apparatus.

As illustrated in FIG. 13, the base station apparatus 1 has the antenna 107, a processor 91, a memory 92, a Radio Frequency (RF) circuit 93, and a network interface 94. The processor 91 is connected to the memory 92, the RF circuit 93, and the network interface 94 with a bus.

The network interface 94 is an interface for connecting the EPC 3 and any other base station apparatus 1. Furthermore, the RF circuit 93 is connected to the antenna 107. The RF circuit 93 realizes functions the reception unit 102 and the transmission unit 103 that are illustrated in FIG. 1.

Stored in the memory 92 are various programs that include a program for realizing functions of the communication control unit 101, the signal processing unit 104, the reliability determination unit 105, and the CSI feedback setting notification unit 106, which are illustrated in FIG. 1.

The processor 91 reads various programs that are stored in the memory 92 and loads the various programs onto the memory 92 for execution, and thus realizes the functions of the communication control unit 101, the signal processing unit 104, the reliability determination unit 105, and the CSI feedback setting notification unit 106, which are illustrated in FIG. 1.

Figure 14:
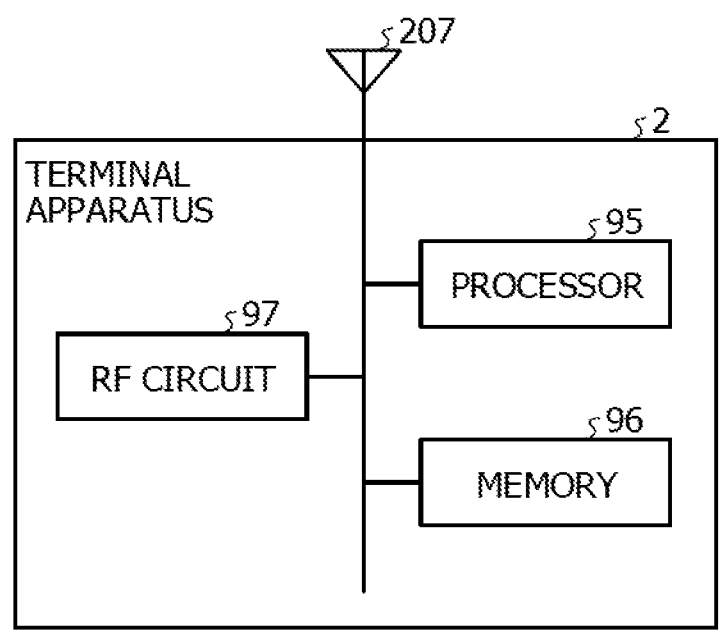
FIG. 14 is a diagram illustrating a hardware configuration of a terminal apparatus.

Next, a hardware configuration of the terminal apparatus 2 will be described with reference to FIG. 14. FIG. 14 is a diagram illustrating the hardware configuration of the terminal apparatus.

As illustrated in FIG. 14, the terminal apparatus 2 has the antenna 207, a processor 95, a memory 96, and an RF circuit 97. The processor 95 is connected to the memory 96 and the RF circuit 97 with a bus. The RF circuit 97 is connected to the antenna 207. Then, the RF circuit 97 is realized functions of the reception unit 201 and the transmission unit 204 that are illustrated in FIG. 2.

Stored in the memory 96 are various programs that include a program for realizing functions of the signal processing unit 202, the communication control unit 203, the channel measurement unit 205, and the channel information calculation unit 206, which are illustrated in FIG. 2.

The processor 95 reads various programs that are stored in the memory 96 and loads the various programs onto the memory 96 for execution, and thus realizes the functions of the signal processing unit 202, the communication control unit 203, the channel measurement unit 205, and the channel information calculation unit 206, which are illustrated in FIG. 2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus comprising:
   a memory; and
   processor circuitry coupled to the memory, wherein the processor circuitry is configured to:
   execute notification processing that comprises transmitting a notification signal to a terminal, the notification signal including a first information, the first information being associated with a reliability with respect to data transmission to the terminal,
   execute transmission processing that comprises transmitting a reference signal in two or more frequency bands, and
   execute reception processing that comprises receiving a measurement report from the terminal, the measurement report including a channel quality information of the frequency bands, the channel quality information being derived by the terminal in accordance with the reliability associated with the first information.

2. The base station apparatus of claim 1, wherein the processor circuitry is further configured to:
   determine a transmission setting after performing the notification processing,
   execute signal processing that comprises performing processing on a first signal by using the transmission setting, and
   execute second transmission processing that comprises transmitting the first signal processed by the transmission setting.

3. The base station apparatus of claim 2, wherein the processor circuitry is further configured to execute the transmission processing to determine the transmission setting by using a correlation relationship between signals in the frequency bands.

4. The base station apparatus of claim 2, wherein the processor circuitry is further configured to execute the transmission processing to determine the transmission setting by using a length of time from a first time to a second time, the first time being for measurement of each of a plurality of channels in the frequency bands, the second time being when the first signal is to be transmitted.

5. The base station apparatus of claim 2, wherein the processor circuitry is further configured to execute the transmission processing to determine the transmission setting which comprises a radio resource that is allocated to a signal in the frequency bands, a modulation scheme, and a coding rate.

6. The base station apparatus of claim 1, wherein the channel quality information is a channel quality information of non-contiguous frequency bands.

7. A terminal apparatus comprising:
a radio frequency circuit; and
processor circuitry coupled to the radio frequency circuit, wherein the processor circuitry is configured to:
execute reception processing for receiving, via the radio frequency circuit, a plurality of signals in two or more frequency bands,
execute measurement setting processing that acquires, via the radio frequency circuit, a first information associated with a reliability with respect to data transmission to the terminal,
execute channel measurement processing that measures a plurality of channels in the frequency bands,
execute channel information calculation processing that acquires quality information indicating a total quality of the frequency bands, by calculating the total quality in accordance with the reliability associated with the first information, and
execute transmission processing, via the radio frequency circuit, that transmits a measurement report which includes the quality information.

8. The terminal apparatus of claim 7, wherein the processor circuitry is further configured to:
execute the channel information calculation processing to calculate a correlation relationship between each of the plurality of signals in the frequency bands, and
transmit the correlation relationship via the radio frequency circuit.

9. The terminal apparatus of claim 7, wherein the processor circuitry is further configured to:
execute the transmission processing to transmit, via the radio frequency circuit, time information indicating a time at which the channel measurement processing is performed.

10. A wireless communication method comprising:
executing, via processor circuitry, notification processing that comprises transmitting a notification signal of a first information, the first information being associated with a reliability with respect to data transmission,
executing, via the processor circuitry, transmission processing that comprises transmitting a reference signal in two or more frequency bands,
executing, via the processor circuitry, reception processing that comprises receiving a measurement report that includes a channel quality information of the frequency bands, the channel quality information being derived in accordance with the reliability associated with the first information.

11. The wireless communication method of claim 10, further comprising:
determining a transmission setting after performing the notification processing,
executing signal processing that comprises performing processing on a first signal by using the transmission setting, and
executing second transmission processing that comprises transmitting the first signal processed by the transmission setting.

12. The wireless communication method of claim 11, further comprising executing the transmission processing to determine the transmission setting by using a correlation relationship between signals in the frequency bands.

13. The wireless communication method of claim 11, wherein the processor circuitry is further configured to execute the transmission processing to determine the transmission setting by using a length of time from a first time to a second time, the first time being for measurement of each of a plurality of channels in the frequency bands, the second time being when the first signal is to be transmitted.

14. The wireless communication method of claim 11, further configuring executing the transmission processing to determine the transmission setting which comprises a radio resource that is allocated to a signal in the frequency bands, a modulation scheme, and a coding rate.

15. The wireless communication method of claim 10, wherein the wireless communication method is implemented in a base station apparatus.

16. The wireless communication method of claim 10, wherein the channel quality information is a channel quality information of non-contiguous frequency bands.

17. A wireless communication method comprising:
executing reception processing for receiving, via a radio frequency circuit, a plurality of signals in frequency bands,
executing measurement setting processing that acquires, via the radio frequency circuit, first information associated with a reliability with respect to data transmission,
executing channel measurement processing that measures a plurality of channels in the frequency bands,
executing channel information calculation processing that acquires quality information indicating a total quality of the frequency bands, by calculating the total quality in accordance with the reliability associated with the first information, and
executing transmission processing, via the radio frequency circuit, that transmits a measurement report which includes the quality information.

18. The wireless communication method of claim 17, further comprising:
executing the channel information calculation processing to calculate a correlation relationship between each of the plurality of signals in the frequency bands, and
transmitting the correlation relationship via the radio frequency circuit.

19. The wireless communication method of claim 17, further comprising:
executing the transmission processing to transmit, via the radio frequency circuit, time information indicating a time at which the channel measurement processing is performed.

20. The wireless communication method of claim 17, wherein the wireless communication method is implemented in a terminal apparatus.

* * * * *